(12) United States Patent
Hecht et al.

(10) Patent No.: US 8,576,750 B1
(45) Date of Patent: Nov. 5, 2013

(54) MANAGED CONFERENCE CALLING

(75) Inventors: Greg Hecht, Mountain View, CA (US);
Anthony Jawad, Mountain View, CA (US); Michel Ossesia, Menlo Park, CA (US); Stuart R Blair, Portola Valley, CA (US); Vincent Paquet, San Jose, CA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/051,882

(22) Filed: Mar. 18, 2011

(51) Int. Cl.
*H04L 12/16* (2006.01)
*H04Q 11/00* (2006.01)
*H04M 3/42* (2006.01)

(52) U.S. Cl.
USPC ......... 370/261; 370/271; 379/202.1; 455/416

(58) Field of Classification Search
USPC ........ 370/259–262, 271; 379/202.01–205.01; 455/416
See application file for complete search history.

(56) References Cited

U.S. PATENT DOCUMENTS

| | | | |
|---|---|---|---|
| 7,353,251 B1 | 4/2008 | Balakrishnan | |
| 2004/0071099 A1* | 4/2004 | Costa-Requena et al. | 370/260 |
| 2004/0221037 A1* | 11/2004 | Costa-Requena et al. | 709/225 |
| 2005/0018826 A1* | 1/2005 | Benco et al. | 379/202.01 |
| 2005/0273510 A1 | 12/2005 | Schuh | |
| 2006/0153122 A1 | 7/2006 | Hinman et al. | |
| 2006/0244818 A1* | 11/2006 | Majors et al. | 348/14.08 |
| 2007/0038701 A1 | 2/2007 | Majors et al. | |
| 2007/0111743 A1 | 5/2007 | Leigh et al. | |
| 2007/0115919 A1 | 5/2007 | Chahal et al. | |
| 2007/0263824 A1* | 11/2007 | Bangalore et al. | 379/202.01 |
| 2007/0286388 A1 | 12/2007 | Vaught et al. | |
| 2009/0220064 A1* | 9/2009 | Gorti et al. | 379/202.01 |
| 2010/0158213 A1 | 6/2010 | Mikan et al. | |
| 2011/0271206 A1* | 11/2011 | Jones et al. | 715/753 |

OTHER PUBLICATIONS

"AccuConference," Product Information Brochure [online]. TalkPath, LLC, Las Vegas, NV, 2011. Retrieved from the Internet: <http://www.accuconference.com/white.papers.aspx> (5 pgs.).
"Unified Meeting User Guide v. 4.10.12," Product Information Brochure [online]. ConferenceCall.com, Carrollton, TX. Last modified on Jan. 19, 2011. Retrieved from the Internet: <http://www.conferencecall.com/services/web-conferencing.php> (15 pgs.).

(Continued)

*Primary Examiner* — Xavier S. Wong
*Assistant Examiner* — Jeremy Costin
(74) *Attorney, Agent, or Firm* — Shumaker & Sieffert, P.A.

(57) ABSTRACT

The subject matter of this disclosure can be implemented in, among other things, a method. In these examples, the method includes receiving a request to join a conference call from a user, and determining whether the user is allowed to join the conference call based on an access policy configurable by a moderator of the conference call. The method may also include upon determining that the user is allowed to join the conference call, connecting the user to the conference all, determining a set of permissions granted to the user for participating on the conference call based on the access policy, and outputting a user interface to the user or sending a message to another computing device to cause the other computing device to output the user interface to the user, wherein the user interface includes a set of conference call management options based upon the set of permissions granted to the user.

17 Claims, 5 Drawing Sheets

(56) References Cited

OTHER PUBLICATIONS

"Web Conferencing, Video Conferencing & Desktop Sharing: WebEx Meeting Center" Product Information Brochure [online]. Cisco Systems, Inc., 2011. Retrieved from the Internet: <http://www.webex.com/products/web-conferencing.html> (3 pgs.).
Office Action from U.S. Appl. No. 13/250,547, dated Dec. 5, 2011, 23 pp.
Response to Office Action dated Dec. 5, 2011, from U.S. Appl. No. 13/250,547, filed Mar. 5, 2012, 13 pp.
Office Action from U.S. Appl. No, 13/250,547, dated May 17, 2012, 24 pp.
Response to Office Action dated May 17, 2012, from U.S. Appl. No. 13/250,547, filed Jul. 17, 2012, 14 pp.
Office Action from U.S. Appl. No. 13/250,547, dated Mar. 14, 2013, 28 pp.
Response to Office Action dated Mar. 14, 2013, from U.S. Appl. No. 13/250,547, filed Jun. 14, 2013, 13 pp.

* cited by examiner

MANAGED CONFERENCE CALLING

TECHNICAL FIELD

The disclosure relates to communication systems, and, more particularly to managing conference calls.

BACKGROUND

When multiple individuals would like to discuss a matter over a phone call, the individuals may join a conference call to participate in the discussion. Typically, the conference call includes one moderator who may perform various administrative actions with respect to the conference call. In the traditional model, the moderator may set up a virtual "room" based on a telephone number and a predefined conference call identifier, such as a conference code. The moderator may also identify the billing account associated with the conference call. Typically, the moderator may control who may join or is currently connected to the conference call by attempting to control the distribution of the predefined conference code that provides access to the conference call.

SUMMARY

In general, this disclosure is directed to techniques for managing conference calls between two or more participants using computing devices, such as personal computers, tablet computers, and cellular telephones. The techniques involve using application controls and time-based access policies to manage the conference calls including managing the users able to join the conference calls and managing the active participants on existing conference calls. The techniques of this disclosure may also provide a manner in which establishing conference calls may be automated using calendaring software. For example, a moderator may schedule a meeting for a particular time. Once the scheduled time arrives, each participant may be automatically dialed or automatically joined to the conference call.

In one example, a method includes receiving a request to join a conference call from a user, and determining whether the user is allowed to join the conference call based on an access policy configurable by a moderator of the conference call. Upon determining that the user is allowed to join the conference call, the method also includes connecting the user to the conference call, determining a group of permissions granted to the user for participating on the conference call based on the access policy, and outputting a user interface to the user or sending a message to another computing device to cause the other computing device to output the user interface to the user, wherein the user interface includes a group of conference call management options based upon the group of permissions granted to the user for participating on the conference call.

In another example, a computer-readable medium is encoded with instructions that if executed by one or more programmable processors of a computing device cause the computing device to perform operations including receiving a request to join a conference call from a user, and determining whether the user is allowed to join the conference call based on an access policy configurable by a moderator of the conference call. The operations also include, upon determining that the user is allowed to join the conference call, connecting the user to the conference call, determining a group of permissions granted to the user for participating on the conference call based on the access policy, and outputting a user interface to the user or send a message to another computing device to cause the other computing device to output the user interface to the user, wherein the user interface includes a group of conference call management options based upon the group of permissions granted to the user for participating on the conference call.

In another example, a system includes one or more processors, means to receive a request to join a conference call from a user, an access management module, a managed call resource module, and a user interface module. The access management module is executable by the one or more processors to determine whether the user is allowed to join the conference call based on an access policy configurable by a moderator of the conference call, and upon determining that the user is allowed to join the conference call, determine a group of permissions granted to the user for participating on the conference call based on the access policy, connect the user to the conference call, and output a user interface to the user or send a message to another computing device to cause the other computing device to output the user interface to the user, wherein the user interface includes a group of conference call management options based upon the group of permissions granted to the user for participating on the conference call.

The techniques of this disclosure may provide several advantages. For example, these techniques may enable a moderator to dynamically manage a conference call. For example, the moderator may actively dial participants, remove or mute existing participants, send invitations to other users so that they may connect to the call at their leisure, and view statistics about each participant on the call, including information about time-on-call and cost-of-call-leg. By dynamically managing access policies, the moderator may have greater control over the participants included on a conference call and may better manage the costs associated with the conference call.

The details of one or more examples are set forth in the accompanying drawings and the description below. Other features, objects, and advantages will be apparent from the description and drawings, and from the claims.

DETAILED DESCRIPTION

Figure 1:
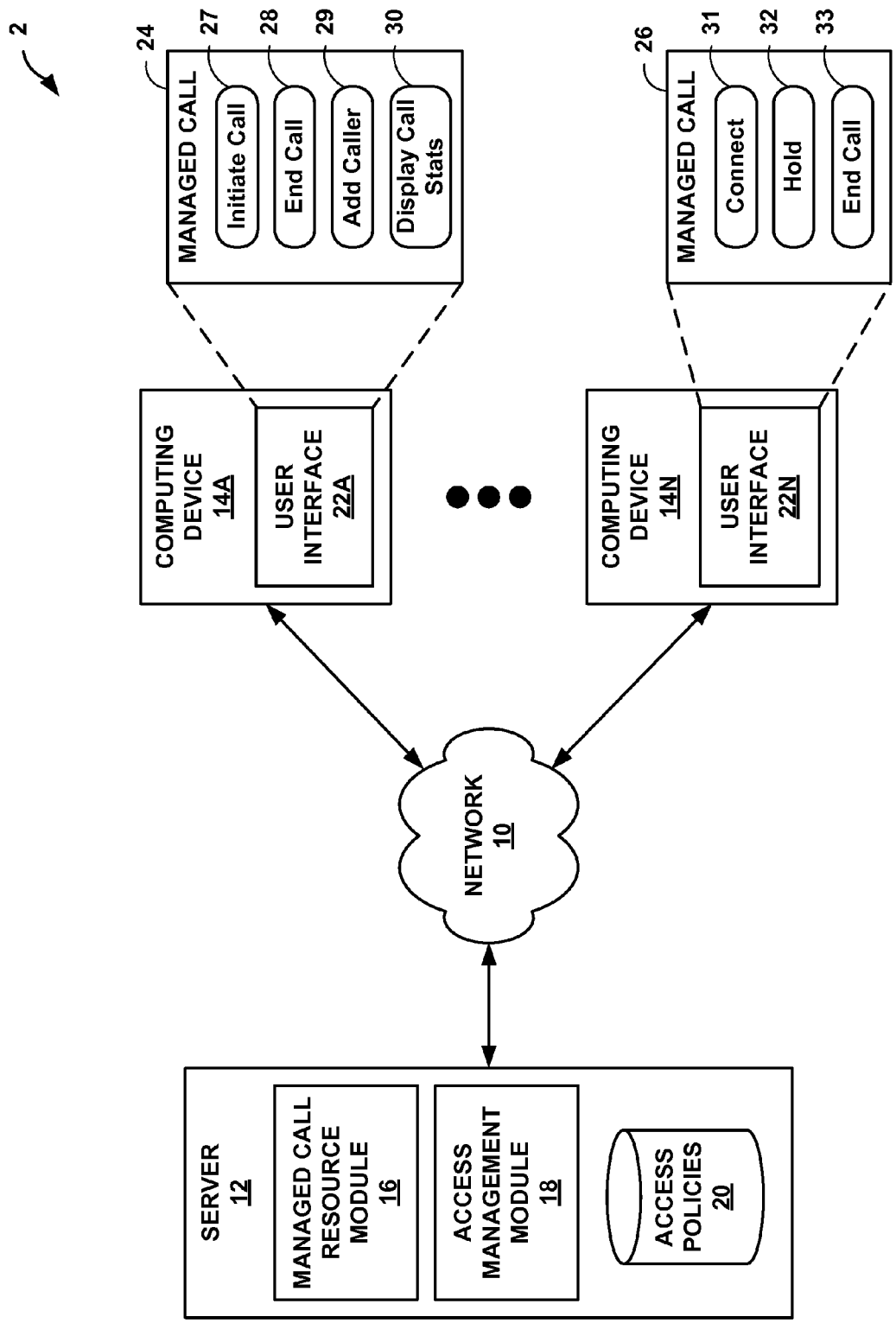
FIG. 1 is a conceptual diagram illustrating one example communication system with example moderator and user interfaces displayed, in accordance with one aspect of the present disclosure.

From time to time, a user may participate in a conference call that includes one or more other users. For example, a user may dial a predetermined conference call phone number and enter a predetermined conference access code to access a virtual conference call "room." Upon entering the predetermined information, the user is connected to the conference call. However, managing these conference calls may be cumbersome or difficult. The predetermined phone number and access code may be distributed beyond the intended user group, which may result in additional costs for the user hosting the conference call. Furthermore, the user who is hosting the conference call may have few capabilities for managing the conference call and the user's role is typically little more than to reserve the room and identify the billing account.

As described in further detail herein, a managed conference call model may enable a moderator to manage many different aspects of a conference call, including dynamically managing certain aspects while the conference call is in progress. A user that is given moderator privileges for managing a conference call may be referred to as a moderator. Typically, moderators are pre-designated users who are given permission to control aspects of the conference call and that are presented with a moderator user interface for managing the conference call. The moderator may use the interface to add new users to the conference call as participants, manage the access policies applied by the access endpoints, invite users to connect through the access endpoint and become participants, manage existing participants by, for example, muting a participant, recording one or more participants, or evicting a participant, and to view statistical information about the conference call, such as call duration, cost information, and participant information.

When moderating an ongoing conference call, the techniques of this disclosure may enable the moderator to dynamically configure access policies applied by elements of the managed conference call model during the conference call. For example, the moderator may utilize application controls and access policies to manage the conference calls including managing the users able to join the conference calls and managing the active participants on existing conference calls. The managed conference call model may include an access manager element to apply access policies and manage the users. For example, the access manager may apply access policies that specify which users are permitted to join each conference call and what permissions each user is assigned for a particular conference call Each participant may connect to the conference call in a variety of ways. In some examples, a participant may be connected to the call by a moderator either at the start of the call or during an existing call. A participant may also connect to the call by connecting him or herself to the access manager where the access endpoint applies a policy that allows the participant to join the call. In other examples, one or more participants may be automatically connected to the conference call based on a scheduled meeting in a calendaring system.

In other examples, the moderator may establish a managed conference call using calendaring software such that the conference call is automatically initiated at the specified date and time with the specified participants (e.g., by automatically dialing or otherwise connecting the specified participants to the conference call). Each participant may join the call using one or more different types of audio and/or video protocols, including conventional telephony and Voice Over Internet Protocol (VOIP).

In accordance with one aspect of this disclosure, the managed conference call model may include a managed call resource element. The managed call resource may mix the audio from each participant and output the mixed audio to each participant (e.g, when one participant connects via conventional telephony and another participant connects via VOIP). The managed call resource may also maintain state information for a conference call, including who is connected and the duration and cost per leg of the conference call. Each managed call resource may correspond to an instance of a managed conference call and multiple managed call resources may be load balanced across multiple servers. In some examples, after the access manager grants access to a user to a particular conference call, an access endpoint (e.g., a server configured in accordance with the techniques of this disclosure) may route the user to the particular instance of the managed call resource that corresponds to the desired conference call or may create a new instance of a managed call resource for the desired conference call if one has not yet been created.

The techniques described herein may provide a moderator with additional conference call management capabilities. For example, the techniques may enable the moderator to dynamically manage the participants included on a conference call as well as the costs associated with the conference call while the conference call is in progress. In addition, the techniques may enable the moderator to automatically initiate a conference call based on a scheduled event. In this way, the moderator may better manage the participants invited to join a conference call as well as better ensure the desired participants actually connect to the scheduled conference call at the scheduled time.

FIG. 1 is a conceptual diagram illustrating one example communication system 2 with an example moderator user interface 24 and participant user interface 26 displayed, in accordance with one aspect of the present disclosure. As shown in FIG. 1, communication system 2 includes network 10, server 12, and computing devices 14A-14N (collectively, "computing devices 14"). Examples of computing devices 14 include, but are not limited to, portable or mobile devices such as cellular phones, personal digital assistants, laptop computers, tablet computers, portable gaming devices, portable media players, e-book readers, and watches as well as non-portable devices such as desktop computers. For purposes of illustration only, in this disclosure, computing devices 14 are described as portable or mobile devices that a user can carry, and laptop or desktop computers, but aspects of this disclosure should not be considered limited to these devices.

Server 12 and computing devices 14 are connected to network 10 via wired and/or wireless links. Computing devices 14 may send data to or receive data from server 12 via network 10. Network 10 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). Server 12 may be any of several different types of network devices. For instance, server 12 may be a conventional web server, specialized media server, personal computer operating in a peer-to-peer faction, or other types of network devices.

In some examples, server 12 may provide managed conference calling capabilities in accordance with one aspect of this disclosure. For example, server 12 may operate as an access endpoint for one or more computing devices 14 for a managed conference call. As shown in FIG. 1, server 12 includes managed call resource module 16, access management module 18, and access policies data store 20. While illustrated as individual modules residing within a single server 12, the modules may be distributed among multiple servers 12 and the functionality of each module may be distributed among the multiple servers 12. In general, managed call resource module 16 provides managed call shared resources for managed conference calls for which server 12 operates as an access endpoint. In one embodiment, one instance of the managed call shared resource is associated with each managed conference call. The managed call shared resource may maintain state information for a conference call, including who is connected and the duration and cost per leg of the call.

Access management module 18, in various instances, provides server 12 with the capabilities to operate as an endpoint through which participants may connect to a managed conference call. Typically, access management module 18 applies policies stored in access policies data store 20 to restrict access to the managed conference call. Access policies data store 20 stores access policies that specify rights for each participant. For example, access policies may specify which participants may connect to a managed conference call (e.g., by applying a user whitelist that includes information about each user that is permitted to connect to the managed conference call), how long each participant may remain connected to the managed call, and which portions of the managed call each participant is allowed to be connected.

In some embodiments, access policies may also specify rights based on a group to which a participant belongs. Certain groups of participants may be granted more access than other groups of participants. For example, a moderator group may be granted additional call moderation rights that a participant group may not be granted. In another example, one group of participants may be permitted to remain connected to a managed conference call for the entire duration of the managed conference call while a second group of participants is permitted to remain connected to the managed conference call for the first 15 minutes. In general, access policies may be configured by the moderator prior to or during an ongoing managed conference call.

A user may authenticate using various authentication credentials, including a username and password combination, a numeric code, the caller identification information associated with the telephone from which the user is attempting to connect to the managed conference call, network information, or web-based information, among other authentication credentials. The numeric code, in some examples, may be a single use code for accessing a particular managed conference call. Network information may be utilized as an authentication credential when, for example, the user is utilizing a computer to join a managed conference call. The Internet Protocol (IP) address of the computer may be used as the authentication credentials such that, in various instances, the user may be granted access to participate in the conference call without entering additional information.

In another example, the user may be utilizing a computer to access a corporate intranet site. In this example, the corporate intranet site may install a cookie on the user's computer upon the user being granted access to the intranet site. When the user attempts to connect to the managed conference call, the cookie may be used as the authentication credentials. In this manner, web-based information may be used as authentication credentials and may enable the user to connect to the managed conference call without entering other authentication information (e.g., user identifier, password) specific to the managed conference call. In other examples, a moderator may directly connect a user to a managed conference call. In these examples, the moderator may assign a group of default access policies or may assign custom access policies to be applied to the user upon connecting the user to the managed conference call.

Computing devices 14A-14N may each include a respective user interface module 22A-22N (collectively, "user interface modules 22"). User interface modules 22 may provide graphical user interfaces for users to join, participate, and/or manage a managed conference call. When a user attempts to connect to a managed conference call, the user provides authentication credentials. In examples where the user is attempting to connect to the managed conference call via one of computing devices 14, the user may provide the authentication credentials using user interface modules 22. For example, a user may enter a username and password combination via user interface module 22, which is transmitted to server 12 for authentication. Upon successful authentication, user interface module 22 may provide different user interfaces to different users based on the authentication information and the access policies applied to the user by access management module 18 of server 12.

In one example, a user may provide authentication credentials to server 12 via user computing device 14A that authenticate the user as a moderator. In this example, the user may be provided with moderator interface 24 by user interface module 22A. Moderator interface 24 may provide the user with various options to moderate the managed call. For example, moderator interface 24 may provide buttons 27, 28, 29, and 30 that enable the user to initiate a call via initiate call button 27, end a call via end call button 28, add another user to a call via add caller button 29, or display call statistics via display call statistics button 30.

In another example, a user may provide authentication credentials to server 12 via computing device 14N that authenticate the user as a participant. In this example, the user may be provided with participant interface 26 by user interface module 24N. Participant interface 26 may provide the user with various options to manage the user's participation on the managed call. For example, participant interface 26 provides the user with the functionality to connect to a managed conference call via connect button 31, place the managed conference call on hold via hold button 32, or end the user's participation on a managed call via end call button 33.

While the techniques of this disclosure are described with respect to a user connecting via one of computing devices 14 and providing authentication credentials to server 12, a user may also connect to a managed conference call via an analog telephone (or provide authentication information to a trusted authority. It is contemplated that users may connect to a single managed call via several different types of devices, such as computing devices 14, an analog telephone, and other types of communication devices. Managed call resource module 16 may mix the audio from each participant and output the mixed audio to each participant. When a user connects to a managed conference call with a conventional telephone, the user may provide a predetermined conference code. When determining whether the user is authorized to connect to the managed conference call, access module 18 may determine whether the conference code entered by the user matches the stored conference code associated with the managed conference call and may also retrieve caller identification information associated with the user (e.g., the telephone number from which the user is calling) and apply a whitelist to the caller identification information. For example, if a user enters a matching conference code, but is calling from a telephone that is not permitted to connect to the conference call, as indicated by the whitelist, the user may not be permitted to connect to the conference call.

In some examples, a trusted authority may perform the authentication. The trusted authority may include a third-party trusted server, a server other than server 12 (e.g., located within the same corporate network that may span different physical or geographical locations), or some other computing device configured to perform user authentication on behalf of server 12. If the user is authenticated, the trusted authority may generate and send authentication credentials to the one of computing devices 14 being used to connect to the managed conference call (e.g., computing device 14A) or directly to server 12. In an example where the trusted authority sends the authentication credentials to computing device 14A, computing device 14A may then provide the received authentication credentials to server 12. Server 12 may validate the authentication credentials with access management module 18, as described above.

Figure 2:
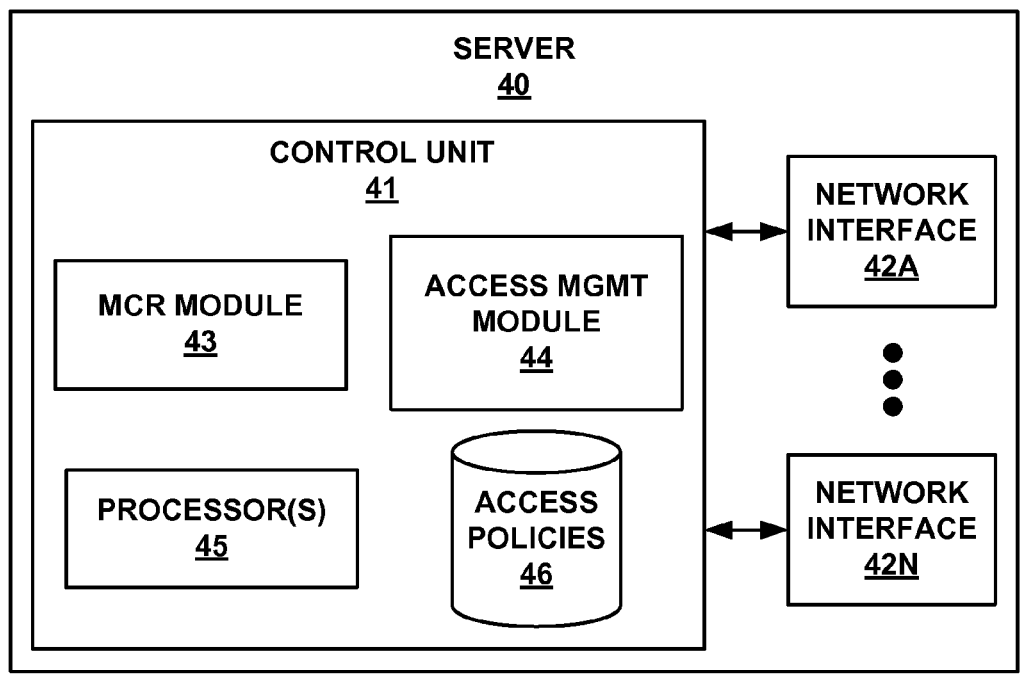
FIG. 2 is a block diagram illustrating an example server, in accordance with one aspect of the present disclosure.

FIG. 2 is a block diagram illustrating an example server 40, in accordance with one aspect of the present disclosure. In some examples, server 40 may be configured similarly to server 12 shown in FIG. 1. As shown in the example illustrated in FIG. 2, server 40 includes a control unit 41 and network interfaces 42A-42N (collectively, "network interfaces 42").

Network interfaces 42 receive and output data over a network, such as network 10 of FIG. 1. In one example, network interfaces 42 may correspond to an interface for receiving data from computing devices (e.g., computing devices 14 of FIG. 1). Output interfaces of network interfaces 42 may include one or more interfaces for outputting data to the computing devices. In some examples, input and output network interfaces 42 may be functionally integrated, while in other examples, input and output interfaces may be separate interfaces of network interfaces 42. For example, network interfaces 42 may include one or more network interface cards (NICs) configured to communicate over, for example, Ethernet, transmission control protocol (TCP), Internet protocol (IP), asynchronous transfer mode (ATM), or other network communication protocols. In some examples, server 40 may include a plurality of either or both input and output interfaces.

Control unit 41 includes managed call resource module (MCR MODULE) 43, access management module (ACCESS MGMT MODULE) 44, processors 45, and access policies data store 46, in the example of FIG. 2. While illustrated as individual modules residing within a single server 40, the managed call resource module 43, access management module 44, and access policies data store 46 may be distributed among multiple servers that communicate over a network (e.g., network 10 of FIG. 1) and the functionality of each module may be distributed among the multiple servers.

Control unit 41 may include any combination of hardware, software, and or firmware for performing the functions attributed to control unit 41. For example, control unit 41 may include one or more processors 45 and a computer-readable storage medium encoded with instructions for managed call resource module 43, access management module 44, and access policies data store 46. In another example, control unit 41 may include one or more microprocessors, digital signal processors (DSPs), application specific integrated circuits (ASICs), field programmable gate arrays (FPGAs), or any other equivalent integrated or discrete logic circuitry, as well as any combinations of such components. Similarly, any or all of managed call resource module 43 and access management module 44 may be functionally integrated. Any applications implemented within or executed by server 40, e.g., managed call resource module 43, may be implemented or contained within, operable by, executed by, and/or be operatively coupled to control unit 41, network interfaces 42, and/or processors 45.

Managed call resource module 43 may comprises a software application implemented by control unit 41 and/or processors 45 and may represent one example of managed call resource module 16 of FIG. 1. Managed call resource module 16 may maintain one or more instances of managed call resources. In general, each instance of a managed call resource corresponds to a single managed conference call. The managed call resource may maintain state information for the corresponding managed conference call including, for example, which users are connected to the managed conference call and the duration and cost for each leg of the managed conference call.

The managed call resource may also manage the audio from each leg of the managed conference call. For example, the managed call resource may perform the operations of mixing the audio from each leg of the managed conference call and outputting the mixed audio to the other legs. In another example, for each managed conference call, the managed call resource may record the audio from one or more legs, mute the audio from one or more legs, and/or transcribe the audio from one or more legs. In some examples, certain aspects of each instance of the managed call resource may be maintained after the managed conference call has ended for various purposes, such as for billing purposes. That is, the managed call resource may maintain certain records relating to each managed conference call including information about the participants, the duration of the call, or a recording of the call itself, as examples. While illustrated as a single managed call resource module 43 within a single server 40, multiple managed conference calls may be load balanced across multiple servers and multiple managed call resource modules.

Access management module 44 may comprise a software application implemented by control unit 41 and/or processors 45 and may be one example of access management module 18 of FIG. 1. Access management module 44 may manage user access to one or more instances of managed call resourced maintained by managed call resource module 43. When a user attempts to connect to a managed conference call, server 40 receives authentication credentials (e.g., caller identification information, device identifier information, a username and password combination, or an access code) and an indication of the managed conference call the user is attempting to join or an indication that the user is attempting to create a new managed conference call from the user via one of network interfaces 42. The authentication credentials are passed to access management module 44, which validates the authentication credentials.

If access management module 44 determines that the received authentication credentials are invalid (e.g., the user does not have permission to create a managed conference call or participate on the desired managed conference call), access management module 44 does not permit the user to create a managed conference call or participate on the desired conference call. In some instances, access management module 44 may send a message to the user indicating that authentication failed.

If access management module 44 determines that the received authentication credentials are valid (e.g., the user is an authorized user), access management module 44 may retrieve a set of access policies from access policies data store 46 that correspond to the authentication credentials. When the user is attempting to connect to an existing managed conference call, access management module 44 directs the user to the instance of managed call resource module 43 that corresponds to the managed conference call to which the user is attempting to connect. When the user is attempting to initiate a new managed conference call, access management module 44 may cause managed call resource module 43 to generate a new instance corresponding to the new managed conference call the user is attempting to initiate. In general, access management module 44 applies a group of access policies stored in access policies data store 46 to the user in order to manage the user's access to various managed conference calls. The group of access policies may define the capabilities the user has with respect to creating, moderating, or participating on a managed conference call.

In examples where multiple managed conference calls are load balanced across multiple servers 40 and multiple managed call resource modules 43, access management module 44 determines whether a particular managed call resource already exists for the desired managed conference call. When the managed call resource already exists, access management module 44 directs the traffic associated with the user to the appropriate instance of the managed call resource. When the managed call resource does not yet exist, access management module 44 causes managed call resource module 43 to create a new instance of a managed call resource associated with the desired managed conference call.

Access policies data store 46 may include various fields for storing information regarding authentication credentials, access rights, and group information. Access policies data store 46 may be stored in the form of one or more tables, databases, linked lists, radix trees, or other suitable data structure, to name only a few examples. In general, access policies may specify which participants may connect to a managed conference call (e.g., by applying a user whitelist that includes information about each user that is permitted to connect to the managed conference call), how long each participant may remain connected to the managed call, and which portions of the managed call each participant is allowed to be connected.

In some embodiments, access policies may also specify rights based on a group to which a participant belongs. Certain groups of participants may be granted more access than other groups of participants. For example, a moderator group may be granted additional call moderation rights that a participant group may not be granted. In another example, one group of participants may be permitted to remain connected to a managed conference call for the entire duration of the managed conference call while a second group of participants is permitted to remain connected to the managed conference call for the first 15 minutes.

In various instances, a moderator of a managed conference call may configure access policies data store 46 using one of computing devices 14 and user interfaces 22. When a moderator establishes a managed conference call by, for example, scheduling the managed conference call or initiating the managed conference call, the moderator may configure a list of authorized users and/or groups of users and an initial set of access policies for the users and/or groups of users.

At any time after establishing the managed conference call, including while the managed conference call is underway, the moderator may change the access policies associated with the managed conference call. For example, the moderator may change the users authorized to participate on the managed conference call or the access policies associated with one or more users or groups of users. Upon completing the changes, the updated information is applied to the managed conference call by access management module 44. In some examples, the updated information may cause one or more users to be disconnected from the conference call or connected to the conference call, and may also change the options available to the user to manage the user's participation in the managed conference call or moderate the managed conference call.

Figure 3:
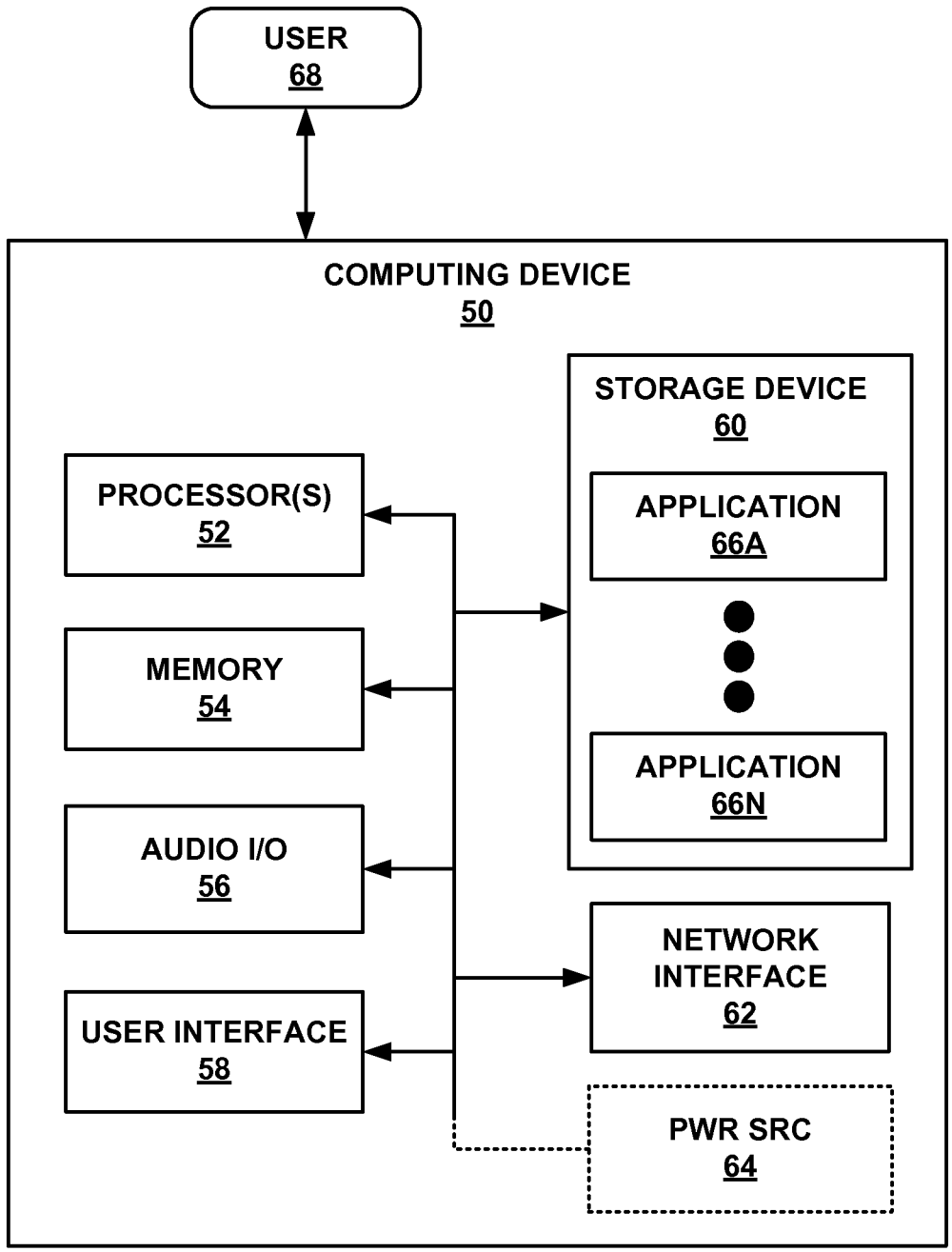
FIG. 3 is a block diagram illustrating an example computing device, in accordance with one aspect of the present disclosure.

FIG. 3 is a block diagram illustrating an example computing device 50, in accordance with one aspect of the present disclosure. As shown in FIG. 2, computing device 50 may include processors 52, memory 54, audio input/output (AUDIO I/O) 56, user interface 58, storage device 60, network interface 62, and an optional power source 64. For instance, if computing device 50 comprises a mobile device, computing device 50 may include a battery as power source 64. Each of components 52, 54, 56, 58, 60, 62, and 64 may be interconnected via one or more busses for inter-component communications. Processors 52 may be configured to implement functionality and/or process instructions for execution within computing device 50. Processors 52 may be capable of processing instructions stored in memory 54 or instructions stored on storage device 60. Audio input/output 56 may record audio from one or more sources such as a microphone and output audio using one or more sources such as a speaker.

User interface 58 may include, for example, a monitor or other display device for presentation of visual information to user 68 of computing device 50. User interface 58 may further include one or more input devices to enable a user to input data, such as a manual keyboard, mouse, touchpad, trackpad, etc. In some example, user interface 58 may comprise a touchscreen, which may be used both to receive and process user input and also to display output information. User interface 58 may further include printers or other devices to output information. In various instances in the description contained herein, references made to user interface 58 may refer to portions of user interface 58 (e.g., touchscreen, mouse device) that provide user input functionality.

Memory 54 may be configured to store information within computing device 50 during operation. Memory 54 may, in some examples, be described as a computer-readable storage medium. In some examples, memory 54 is a temporary memory, meaning that a primary purpose of memory 54 is not long-term storage. Memory 54 may also be described as a volatile memory, meaning that memory 54 does not maintain stored contents when computing device 50 is turned off. Examples of volatile memories include random access memories (RAM), dynamic random access memories (DRAM), static random access memories (SRAM), and other forms of volatile memories known in the art. In some examples, memory 54 may be used to store program instructions for execution by processors 52. Memory 54 may be used by software or applications running on computing device 50 (e.g., software required to moderate managed conference calls) to temporarily store information during program execution.

Storage device 60 may also include one or more computer-readable storage media. Storage device 60 may be configured to store larger amounts of information than memory 54. Storage device 60 may further be configured for long-term storage of information, even when computing device 50 is not operating. In some examples, storage device 60 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 50 may utilize network interface 62 to communicate with external devices (e.g., one or more servers, web servers) via one or more networks. For example, network interface 62 may be configured to communicate with cellular data and/or voice networks (e.g., a GSM network). In addition, or alternatively, network interface 62 may be configured to communicate with wireless local, wide, and/or Metropolitan area networks (e.g., Wi-Fi, WAN, or WiMAX). Computing device 50 may transmit audio data received via audio input/output 56, for example, to other devices, such as server 12 of FIG. 1, using network interface 62. Computing device 50 may also receive audio data from other devices using network interface 62 and output the received audio data via audio input/output 56.

Processors 52 may execute one or more of applications 66A-66N (collectively, "applications 66") either alone or simultaneously. Examples of applications 66 include web browsers, e-mail, programs to retrieve stock quotes, programs to search for restaurants, programs that retrieve current and future weather information, games, programs that play audio and/or video files, programs to search the Internet, programs that provide news, programs that provide maps, and other programs. Applications 66 may be executed based on a request from user 68, and may be terminated based on a request from user 68. Some applications 66 may be running continuously in the background. Some applications 66 may be executed automatically by computing device 50 such as at power up and may be terminated automatically by computing device 50 such as at power down. For purposes of illustration only in the following description, the applications that may be executed by one or more processors 52 are described below as being executed by one processor 52. The applications may be downloaded by user 68 via a network or may be preprogrammed within computing device 50.

User 68 may interact with user interface 58 to execute one or more of applications 66 stored on storage device 60. In some examples, user interface 58 may include a web-based interface for participating in or moderating a managed conference call. In other examples, user interface 58 may include a mobile application (e.g., one of applications 66) that executes within computing device 50 for participating in or moderating a managed conference call.

In response to user input, processor 52 executes the one or more applications selected by user 68, or executes the one or more applications executed by computing device 50. As one example of applications 66, storage device 60 may store application instructions associated with an application for managed conference calls, e.g., application 66A. User 68 may interact with user interface 58 to cause processor 52 to execute application 66A and cause user interface 58 to display the application to user 68.

In one example, the managed conference call application represented by application 66A comprises the Google Voice™ application. After causing processor 52 to execute the managed conference call application, user 68 may interact with user interface 58 to provide information required to join or initiate a managed conference call. User 68 may enter authentication credentials, an indication of the managed conference call that user 68 is attempting to join, and/or an indication that user 68 is attempting to initiate a new managed conference call. The authentication credentials may include username and password combination, a device identifier that uniquely identifies the particular computing device (e.g., computing device 50) the user is using to connect to the managed conference call, a numeric code, and caller identification information associated with the particular device (e.g., a conventional telephone or cellular phone) the user is using to connect to the managed conference call. Computing device 50 directs the entered information to an access endpoint (e.g., server 12 of FIG. 1) for validation.

Computing device 50 receives the results of the authentication credential validation performed by the access endpoint and, upon receiving the results of the validation, the managed call application may update user interface 58 to indicate whether the user was granted or denied the requested access. In examples where user 68 is granted access to initiate a new managed conference call, the managed conference call application may update user interface 58 to display various options user 68 may have when initiating the new managed conference call. For example, the managed conference call application may provide user 68 with the ability to configure various parameters associated with the managed conference call. For example, user 68 may specify one or more other users or groups of users that may participate on the managed conference call, access policies for the users or groups that define what rights each user or group will have with respect to the managed conference call, limitations on duration, cost, or other factors associated with the managed conference call, and a date and time for the managed conference call.

In examples where user 68 is granted access to a managed conference call as a moderator (e.g., the access credentials, when validated with respect to the requested managed conference call, correspond with moderator privileges), the managed conference call application may update user interface 58 to display various options user 68 may have for moderating the managed conference call as well as the status of user 68 (e.g., whether the user is a moderator or participant). For example, the managed conference call application may provide user 68 with the ability to view the managed conference call statistics (e.g., call duration, number and identity of participants, and cost associated with each leg of the call), directly add new participants to the managed conference call by, for example, dialing the new participants, manage access to the call, invite other users to connect to the call through the access endpoint, and manage existing participants (e.g., mute, record, or evict one or more participants). In some examples, the managed conference call application may provider user 68 with the ability to view a list of users not currently granted access to the managed call, but who user 68 may invite or directly connect to the managed conference call. For example, the list of users may be included in an address book stored within computing device 50.

In examples where user 68 is granted access to participate in an existing managed conference call (e.g., the access credentials, when validated with respect to the requested managed conference call, correspond with participant privileges), the managed conference call application may update user interface 58 to display various options user 68 may have while participating in the managed conference call as well as the status of user 68 (e.g., whether the user is a moderator or participant). For example, the managed conference call application may provide user 68 with the option to place the managed conference call on hold, mute the audio input of computing device 50, and end the user's participation in the managed conference call.

User 68 may also connect to a managed conference call without providing authentication credentials via the managed call application. For example, a moderator may connect user 68 to the managed conference call at the beginning of the managed conference call or at any time while the managed conference call is in progress. The moderator may select the user's name from the managed conference call application utilized by the moderator or by directing enter information that identifies the endpoint associated with user 68 (e.g., computing device 50). When connected by a moderator, a set of default access policies may be applied to user 68 and/or the moderator may specify a set of access policies that define the privileges assigned to user 68 at the time moderator connects user 68.

User 68 may also schedule a date and time for a managed conference call using, for example, a calendaring application (e.g., application 70N). User 68 may enter a set of users that are granted access to the managed conference call and the date and time of the managed conference call in the calendaring application. In various instances, the calendaring application may send notices to the specified users that invite the users to the managed conference call. When the specified date and time of the conference call arrives, in some examples, the managed call application may automatically connect all of the specified users. In other examples, the managed call application may automatically connect only the users that responded affirmatively to the invitation (e.g., the users that accepted the invitation).

While described with respect to server 12 of FIG. 1 performing the functionality of an access endpoint, in various instances, computing device 50 may provide the functionality of the access endpoint. For example, user 68 may install a managed conference call access application on computing device 50 as, for example, application 66N. Application 66N may perform the features attributed to managed call resource module 16 and access management module 18 of server 12. Thus, in some examples, server 12 of FIG. 1 may be optional.

Figure 4:
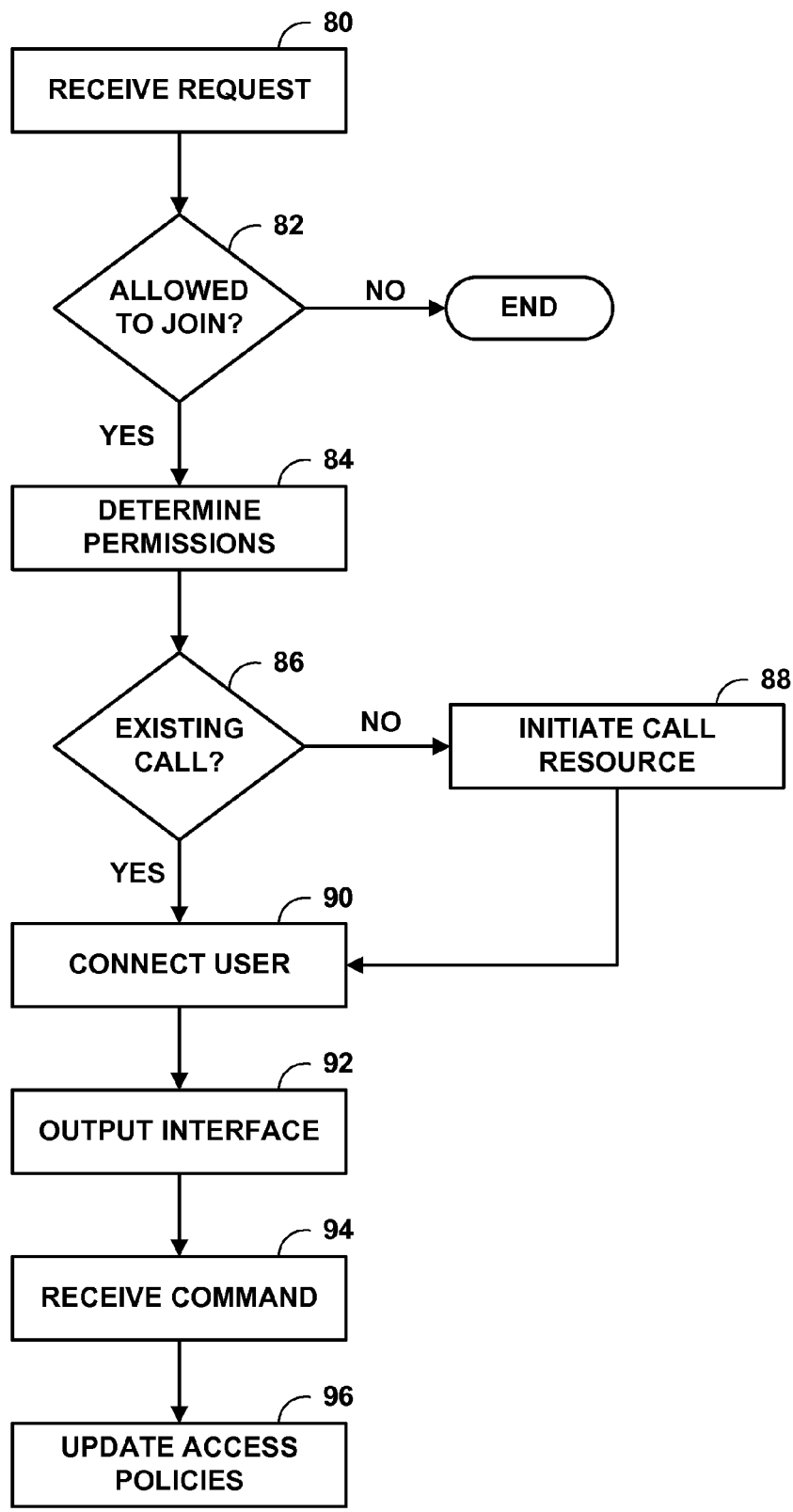
FIG. 4 is a flowchart illustrating an example method for connecting a user to a conference call, in accordance with one aspect of the present disclosure.

FIG. 4 is a flowchart illustrating an example method for connecting a user to a conference call, in accordance with one aspect of the present disclosure. For purposes of illustration only, the example method is described below within the context of communication system 2 of FIG. 1, though various other systems and/or devices may be utilized to implement or perform the method shown in FIG. 4. In the example illustrated in FIG. 4, access management module 18 of server 12 receives a request to join or initiate a managed conference call (80). The request may be received from one of computing devices 14, a conventional wired telephone, or any other endpoint device capable of sending and receiving audio data. The request may include authentication credentials that may uniquely identify the user who is attempting to connect to or initiate a managed conference call or uniquely identify the endpoint device the user is utilizing to connect to or initiate the managed conference call. When the user is attempting to join an existing managed conference call, the request typically includes a call identifier that uniquely identifies a particular managed conference call.

Access management module 18, upon receiving the request, validates the authentication credentials in the context of the requested managed conference call (as appropriate) to determine whether the user is allowed to join the requested managed conference call (82). If the validation fails ("NO" branch of 82), access management module 18 denies the user access and the method ends. In some examples, access management module 18 notifies the user of the failed authentication attempt. If validation is successful ("YES" branch of 82), access management module 18 then determines what permissions the user is granted based on the access policies stored in access policies data store 20 (84).

The user permissions may be determined based on a set of user access policies, a set of group access policies, or a combination of user and group access policies. In general, the access policies determine what rights the user may have with respect to participating in the managed conference call. In one example, the user is granted moderator permissions and may moderate the managed conference call. In another example, the user is granted participant permissions and may participant on the call, but may not moderate the call. In various instances, the same user may be granted different levels of permission on a per call basis. That is, a user may have different access policies applied to the user for each managed conference call. After determining the user's permissions (84), access management module 18 then determines whether the requested managed conference call already exists (86).

If the managed conference call already exists ("YES" branch of 86), then access management module 18 connects the user to the appropriate instance of the managed call resource as maintained by the managed call resource module 16 (90). If the managed conference call does not already exist ("NO" branch of 86), then access managed module 18 causes the managed call resource module 16 to initiate a new instance of the managed call resource and associate the new instance with requested managed conference call. The managed conference call may not yet exist in at least two different scenarios. First, if the user is a moderator who is first establishing the managed conference call. That is, no configuration exists for the managed conference call. In this scenario, a participant may not be permitted to connect until the moderator establishes the managed conference call and configures a set of access policies for the call. Second, if the user is the first user to attempt to connect to an established (e.g., configured) managed conference call, then the user, whether a participant or a moderator, may be permitted to connect to the managed conference call once the managed call resource for the managed conference call has been started (90).

After connecting the user (90), access management module 18 may send a command to the endpoint device the user is utilizing to connect to the managed conference call (e.g., computing device 14A or 14N) which causes the endpoint device to output the appropriate user interface to the user (92). The user interface may be dynamically generated to only include the options granted to the user as determined by the access policies. In one example, the user may be presented with a moderator user interface when the user is determined to have moderator permissions for the managed conference call. In another example, the user may be presented with a participant user interface when the user is determined to have participant permissions for the managed conference call.

While a managed conference call is in progress, a moderator of the call may dynamically update the access policies that are applied to the call. For example, the moderator may use the user interface to send a command to access management module 18 to change one or more access policies (94). The command may include particular access policies and user information. For example, if a moderator chooses to evict a participant, the moderator may send a command to access management module 18 to deny the participant all access to the managed conference call. Upon receiving the command, access management module 18 updates the stored access policies and applies the updated access policies to the managed call (96). In the example where a participant is evicted, applying the updated access policies causes the participant to lose access to the managed conference call. The moderator may change any access policies during the managed conference call, including adding new participants, and applying certain cost or duration limits to one or more users.

Figure 5:
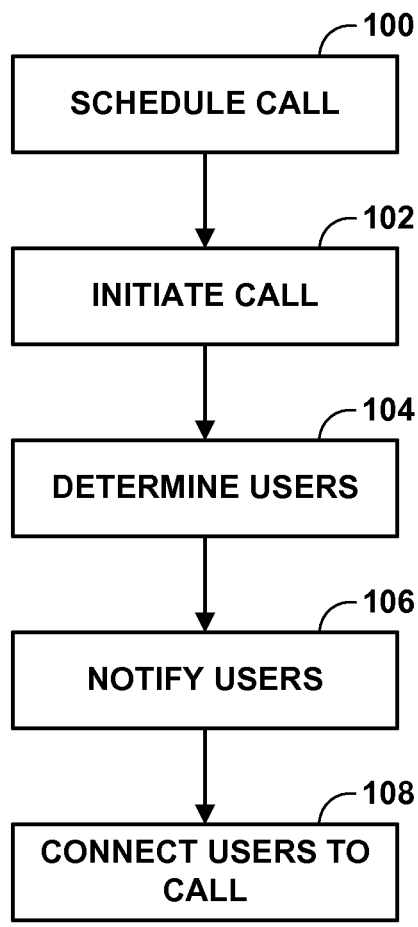
FIG. 5 is a flowchart illustrating an example method for automatically connecting users to a conference call, in accordance with one aspect of the present disclosure.

FIG. 5 is a flowchart illustrating an example method for automatically connecting users to a conference call, in accordance with one aspect of the present disclosure. For purposes of illustration only, the example method is described below within the context of communication system 2 of FIG. 1, though various other systems and/or device may be utilized to implement or perform the method shown in FIG. 5. In the example illustrated in FIG. 5, a user may schedule a managed conference call for a particular date and time using a calendaring application, for example (100). The scheduled call may include a set of requested participants as well as a set of access policies that may be applied to the requested participants. When the scheduled date and time arrives, in some examples, the calendaring application automatically sends authentication credentials to server 12 to initiate the managed conference call. In other examples, an indication of the scheduled call and a set of authentication credential corresponding to the organizing user are stored within server 12. In these examples, access management module 18 may attempt to initiate the managed call with the stored moderator authentication credentials.

In either example, access management module 18 causes resource management module 16 to initiate a new managed conference call at the scheduled time based on the authentication credentials and the access policies included in the scheduled call information (102). After initiating the call, access management module 18 determines the set of users that are to be connected to the managed conference call (104). In some examples, access management module 18 may identify users that have responded affirmatively to an invitation to participate on the managed conference call. In other examples, access management module 18 identifies all requested users included in the scheduled call information.

Access management module 18 may notify the identified users that, for example, the scheduled date and time for the managed conference call has arrived (106) and request that the identified users connect to the managed conference call. In various instances, the notification may include a link or other element to facilitate connecting the user to the managed conference call. Alternatively or in addition, a user (e.g., user 68 of FIG. 3) may be notified by a computing device (e.g., computing device 50 of FIG. 3) that the scheduled date and time of the managed conference call has arrived and request that the user connect to the managed conference call. For example, if user 68 receives an invitation to a managed conference call, computing device 50 may store an indication of the date and time of the scheduled managed conference call as an event in a calendaring application (e.g., application 66A of FIG. 3). The calendaring application detects the events at the scheduled date and time and triggers the notification on computing device 50.

If the user does not connect to the managed conference call within a configurable period of time and/or if access management module 18 is not configured to notify the user of the scheduled managed conference call, access management module 18 may automatically connect the identified users to the call (108). In one example, access management module 18 may utilize endpoint information included in the scheduled call information to connect a particular endpoint to the call. In another example, access management module 18 may utilize username and password information included in the scheduled call information to connect the user via a software application (e.g., the managed call application). In some examples, when an identified user does not connect to the conference call by the scheduled date and time, access management module 18 may send a message to an identified user (e.g., user 68) to cause the user to send a request to join the conference call. Upon receiving the request to join the conference call from the user, access management module 18 may connect the user to the conference call.

In this manner, the techniques of this disclosure may provide a moderator with additional conference call management capabilities. For example, the moderator may dynamically manage the participants included on a conference call as well as the costs associated with the conference call while the conference call is in progress. In addition, the techniques may enable the moderator to automatically initiate a conference call based on a scheduled event. In this way, the moderator may better manage the participants invited to join a conference call as well as better ensure the desired participants actually connect to the scheduled conference call at the scheduled time.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the operations described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer. In some examples, an article of manufacture may comprise one or more computer-readable storage media.

In some examples, a computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in a RAM or cache).

The code or instructions may be software and/or firmware executed by processing circuitry including one or more processors, such as one or more digital signal processors (DSPs), general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

The invention claimed is:

1. A method comprising:
receiving, by a computing device, an indication that a user of a plurality of users accepts an invitation to join a conference call in response to a device associated with the user detecting an event in a calendar of the user, wherein the event is based on an invitation to the conference call, and wherein the invitation includes a scheduled date and time for the conference call;
responsive to determining that a request to join the conference call has not been received by the scheduled date and time, sending, by the computing device, a message to the device associated with the user to join the conference call;
determining, by a computing device, a group of permissions granted to the user for participating in a conference call based on an access policy, wherein a leg of a plurality of legs of the conference call is associated with the user; and outputting, by the computing device, a moderator user interface to a device associated with a moderator managing the conference call, wherein the moderator user interface includes a plurality of moderator options individually applicable to at least one of a particular user of the plurality of users and a particular leg of the plurality of legs of the conference call, wherein the plurality of moderator options include recording one or more of the plurality of legs, transcribing one or more of the plurality of legs, muting one or more of the plurality of legs, disconnecting one or more of the plurality of legs, and configuring access policies that change permissions granted to one or more of the plurality of users, wherein one or more of the plurality of options is selectable during the conference call;

receiving, by the computing device, an indication of at least one moderator option selected during the conference call; and responsive to receiving the indication, applying, by the computing device, one or more of the plurality of moderator options to at least one of the user and the leg associated with the user.

2. The method of claim 1, further comprising:
determining, by the computing device, whether an instance of a managed call resource corresponding to the conference call exists, wherein the managed call resource maintains state information for the conference call;
responsive to determining that the managed call resource corresponding to the conference call does not exist, initiating, by the computing device, an instance of a managed call resource and associate the initiated instance of the managed call resource with the conference call; and
connecting, by the computing device, the device associated with the user to the instance of the managed call resource associated with the conference call.

3. The method of claim 1, further comprising:
receiving, by the computing device, a request to join the conference call from the device associated with the user, wherein the request to join the conference call includes validation information that includes at least one of a conference code, a username and password combination, a device identifier, and authentication credentials;
determining, by the computing device, that the user is allowed to join the conference call based on the validation information; and
connecting, by the computing device, the device associated with the user to the conference call.

4. The method of claim 3,
wherein the access policy includes whitelist information that includes at least one of an allowed conference code, one or more allowed username and password combinations, and one or more allowed device identifiers, and
wherein the user is allowed to join the conference call when the request to join the conference call includes validation information that corresponds to the whitelist information included in the access policy.

5. The method of claim 1, further comprising:
receiving, by the computing device, an indication of at least one participant option selected during the conference call; and
responsive to receiving the indication, modifying, by the computing device, the participant user interface to include a group of conference call statistics, wherein the conference call statistics include at least one of a list of one or more of the plurality of users participating in the conference call, an elapsed duration for one or more of the plurality of users participating in the conference call, and a monetary cost associated with one or more of the plurality of users.

6. The method of claim 3, further comprising:
sending, by the computing device, a reminder message of the conference call to one or more devices associated with the plurality of event users; and
receiving, by the computing device, the request to join the conference call from the device associated with the user based at least in part on the reminder message.

7. The method of claim 6, further comprising:
initiating, by the computing device, an instance of a managed call resource for the conference call; and
connecting, by the computing device, the device associated with the first user to the instance of the managed call resource.

8. The method of claim 3, wherein the device associated with the user is a first device associated with the user and the request to join the conference call is received from a second device associated with the user, the second device being different from each of the computing device, the first device associated with the user, and the device associated with the moderator.

9. The method of claim 3, wherein the user is a first user, the method further comprising:
connecting, by the computing device, a device associated with a second user to the conference call, wherein the device associated with the second user transmits and receives audio via Voice Over Internet Protocol (VOIP) telephony, and wherein the device associated with the first user transmits and receives audio via analog telephony; and
managing, by the computing device, audio transmitted between the device associated with the first user and the device associated with the second user.

10. The method of claim 3, wherein the device associated with the user includes a device type, wherein the device type includes a wired telephone, a wireless telephone, or a telephone software application.

11. The method of claim 3, wherein the user is a first user, wherein the request to join the conference call is received from the device associated with the first user responsive to the first user dialing a first telephone number, wherein the access policy is a first access policy, the method further comprising:
receiving, by the computing device, a second request to join the conference call from a device associated with a second user responsive to the second user dialing a different second telephone number;
applying, by the computing device and based on the first telephone number, the first access policy to the first user; and
applying, by the computing device and based on the second telephone number, a second access policy to the second user.

12. The method of claim 1, wherein the access policy specifies one or more of a certain time the user may participate in the conference call, an elapsed duration of time the user is permitted to participate in the conference call, a maximum monetary cost the user may incur, whether the user is permitted to participate in the conference call, and the group of permissions granted to the user for moderating or participating in the conference call.

13. The method of claim 1, wherein the user is a first user of the plurality of users, the method further comprising:

receiving, by the computing device, a command from the device associated with the moderator of the conference call, wherein the command includes instructions to allow a device associated with a second user of the plurality of users to join the conference call, and wherein the second user is not included in a list of authorized users;

modifying, by the computing device, the access policy to allow the second user to join the conference call and to include the second user in the list of authorized users;

modifying, by the computing device, the group of permissions granted to the first user based on the modified access policy; and modifying, by the computing device and based on the modified group of permissions, a participant user interface output to the device associated with the first user.

14. The method of claim 1, further comprising:
outputting, by the computing device, a participant user interface to the device associated with the user, wherein the participant user interface includes a plurality of participant options based on the group of permissions granted to the user, wherein one or more of the plurality of participant options is selectable during the conference call.

15. The method of claim 1, wherein sending the message to the device associated with the user to join the conference call causes the device associated with the user to automatically join the conference call.

16. A non-transitory computer-readable storage medium comprising instructions, when executed, cause one or more processors to perform operations during a conference call comprising:

receiving, by a computing device, an indication that a user of a plurality of users accepts an invitation to join a conference call in response to a device associated with the user detecting an event in a calendar of the user, wherein the event is based on an invitation to the conference call, and wherein the invitation includes a scheduled date and time for the conference call;

responsive to determining that a request to join the conference call has not been received by the scheduled date and time, sending, by the computing device, a message to the device associated with the user to join the conference call;

determining a group of permissions granted to the user for participating in a conference call based on the selected access policy, wherein a leg of a plurality of legs of the conference call is associated with the user; and outputting a moderator user interface to a device associated with a moderator managing the conference call, wherein the moderator user interface includes a plurality of moderator options individually applicable to at least one of a particular user of the plurality of users and a particular leg of the plurality of legs of the conference call, wherein the plurality of moderator options include recording one or more of the plurality of legs, transcribing one or more of the plurality of legs, muting one or more of the plurality of legs, disconnecting one or more of the plurality of legs, and configuring access policies that change permissions granted to one or more of the plurality of users, wherein one or more of the plurality of options is selectable during the conference call;

receiving, by the computing device, an indication of at least one moderator option selected during the conference call; and responsive to receiving the indication, applying, by the computing device, one or more of the plurality of moderator options to at least one of the user and the leg associated with the user.

17. A system comprising one or more processors, the one or more processors being configured to perform operations during a conference call comprising:

receiving, by a computing device, an indication that a user of a plurality of users accepts an invitation to join a conference call in response to a device associated with the user detecting an event in a calendar of the user, wherein the event is based on an invitation to the conference call, and wherein the invitation includes a scheduled date and time for the conference call;

responsive to determining that a request to join the conference call has not been received by the scheduled date and time, sending, by the computing device, a message to the device associated with the user to join the conference call;

determining, by a computing device, a group of permissions granted to the user for participating in a conference call based on an access policy, wherein a leg of a plurality of legs of the conference call is associated with the user; and outputting, by the computing device, a moderator user interface to a device associated with a moderator managing the conference call, wherein the moderator user interface includes a plurality of moderator options individually applicable to at least one of a particular user of the plurality of users and a particular leg of the plurality of legs of the conference call, wherein the plurality of moderator options include recording one or more of the plurality of legs, transcribing one or more of the plurality of legs, muting one or more of the plurality of legs, disconnecting one or more of the plurality of legs, and configuring access policies that change permissions granted to one or more of the plurality of users, wherein one or more of the plurality of options is selectable during the conference call;

receiving, by the computing device, an indication of at least one moderator option selected during the conference call; and responsive to receiving the indication, applying, by the computing device, one or more of the plurality of moderator options to at least one of the user and the leg associated with the user.

* * * * *